(12) United States Patent
Ohashi et al.

(10) Patent No.: US 12,091,362 B2
(45) Date of Patent: Sep. 17, 2024

(54) CERAMIC ARTICLE PRODUCTION METHOD AND CERAMIC ARTICLE

(71) Applicant: CANON KABUSHIKI KAISHA, Tokyo (JP)

(72) Inventors: Yoshihiro Ohashi, Tokyo (JP); Nobuhiro Yasui, Kanagawa (JP); Hiroshi Saito, Kanagawa (JP); Kanako Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 520 days.

(21) Appl. No.: 17/331,906

(22) Filed: May 27, 2021

(65) Prior Publication Data

US 2021/0309575 A1     Oct. 7, 2021

Related U.S. Application Data

(63) Continuation of application No. PCT/JP2019/047646, filed on Dec. 5, 2019.

(30) Foreign Application Priority Data

Dec. 6, 2018   (JP) .................................. 2018-229383
Dec. 4, 2019   (JP) .................................. 2019-219949

(51) Int. Cl.
   *C04B 35/109*    (2006.01)
   *B28B 1/00*      (2006.01)
   (Continued)

(52) U.S. Cl.
   CPC ............ *C04B 35/109* (2013.01); *B28B 1/001* (2013.01); *B33Y 10/00* (2014.12); *B33Y 80/00* (2014.12);
   (Continued)

(58) Field of Classification Search
   None
   See application file for complete search history.

(56) References Cited

U.S. PATENT DOCUMENTS 4,737,476 A * 4/1988 Hillig .................... C04B 35/195
                                                    501/87
10,759,712 B2   9/2020 Yasui et al.
(Continued)

FOREIGN PATENT DOCUMENTS

JP     2002316866 A  * 10/2002
JP     2017-529297 A    10/2017
(Continued)

OTHER PUBLICATIONS

Onishi, K., Member for Heat Treatment, Oct. 31, 2002, machine translation of JP2002-316866 (Year: 2002).*

(Continued)

*Primary Examiner* — Chinessa T. Golden
(74) *Attorney, Agent, or Firm* — Venable LLP

(57) ABSTRACT

Provided are a method of manufacturing a ceramic article including a porous portion in which improvement in mechanical strength of a modeled article is achieved while high modeling accuracy is obtained, and a ceramic article. The method of manufacturing a ceramic article includes the steps of: (i) irradiating powder of a metal oxide containing aluminum oxide as a main component with an energy beam based on modeling data to melt and solidify or sinter the powder, to thereby form a modeled article including a porous portion; (ii) causing the modeled article formed in the step (i) to absorb a liquid containing a zirconium component; and (iii) heating the modeled article that has absorbed the liquid containing the zirconium component, wherein, in the absorbing step, the liquid is absorbed so that
(Continued)

a ratio of the zirconium component in a metal component contained in the porous portion becomes 0.3 to 2.0 mol %.

18 Claims, 6 Drawing Sheets

(51) Int. Cl.
    *B33Y 10/00*     (2015.01)
    *B33Y 80/00*     (2015.01)
    *C04B 35/63*     (2006.01)
    *C04B 35/64*     (2006.01)
    *C04B 38/00*     (2006.01)

(52) U.S. Cl.
    CPC .......... *C04B 35/6303* (2013.01); *C04B 35/64* (2013.01); *C04B 38/0038* (2013.01); *C04B 38/0054* (2013.01); *C04B 38/0061* (2013.01); *C04B 2235/3217* (2013.01); *C04B 2235/3224* (2013.01); *C04B 2235/3244* (2013.01); *C04B 2235/6026* (2013.01); *C04B 2235/667* (2013.01)

(56) References Cited

U.S. PATENT DOCUMENTS

| | | | |
|---|---|---|---|
| 2006/0127656 A1* | 6/2006 | Gallo | B01J 35/59 |
| | | | 502/303 |
| 2017/0348464 A1 | 12/2017 | Wecker et al. | |
| 2018/0057411 A1 | 3/2018 | Yoshikawa et al. | |
| 2019/0134893 A1 | 5/2019 | Yabuta et al. | |
| 2020/0346982 A1 | 11/2020 | Yasui et al. | |
| 2021/0292240 A1 | 9/2021 | Saito et al. | |

FOREIGN PATENT DOCUMENTS

| | | |
|---|---|---|
| JP | 3213127 U | 10/2017 |
| JP | 2018-031050 A | 3/2018 |
| WO | 2020/116568 A1 | 6/2020 |

OTHER PUBLICATIONS

Khuram Shahzad et al., "Additive Manufacturing of Zirconia Parts by Indirect Selective Laser Sintering," 34(1) J. Eur. Ceram. Soc. 81-89 (Aug. 2013).

Haidong Wu et al., "Fabrication of High-Performance Al2O3-ZrO2 Composite by a Novel Approach That Integrates Stereolithography-Based 3D Printing and Liquid Precursor Infiltration," 209 Mater. Chem. Phys. 31-37 (Jan. 2018).

Yves-Christian Hagedorn et al., "Net shaped high performance oxide ceramic parts by selective laser melting," 5 Physics Procedia 587-594 (2010).

International Search Report in International Application No. PCT/JP2019/047646 (Feb. 2020).

International Preliminary Report on Patentability in International Application No. PCT/JP2019/047646 (Jun. 2021).

First Office Action in Chinese Application No. 201980080468.7 (Mar. 2022).

Saito et al., U.S. Appl. No. 17/340,278, filed Jun. 7, 2021.

Notice of Reasons for Refusal in Japanese Application No. 2019-219949 (Nov. 2023).

Notice of Reasons for Refusal in Japanese Application No. 2019-219949 (Mar. 2024).

\* cited by examiner

CERAMIC ARTICLE PRODUCTION METHOD AND CERAMIC ARTICLE

CROSS-REFERENCE TO RELATED APPLICATIONS

This application is a Continuation of International Patent Application No. PCT/JP2019/047646, filed Dec. 5, 2019, which claims the benefit of Japanese Patent Application No. 2018-229383, filed on Dec. 6, 2018, and Japanese Patent Application No. 2019-219949, filed on Dec. 4, 2019, all of which are hereby incorporated by reference herein in their entirety.

BACKGROUND OF THE INVENTION

Field of the Invention

The present invention relates to a method of manufacturing a ceramic modeled article, and more particularly, to a method of manufacturing a ceramic three-dimensional modeled article having a porous structure.

Description of the Related Art

In recent years, in applications in which prototypes are produced in a short period of time or a small number of components are produced, there has been widely used a method of manufacturing a three-dimensional modeled article of a direct modeling system of obtaining a desired modeled article, in particular, a three-dimensional modeled article by bonding material powder with an energy beam. The three-dimensional modeled article obtained by the direct modeling system has an advantage in that high modeling accuracy is obtained because the three-dimensional modeled article does not significantly shrink in subsequent heat treatment. Here, the modeling accuracy in the present invention refers to a difference (change ratio) between the dimensions of a ceramic article that has undergone a firing step after modeling and the design dimensions designated through use of CAD or the like. In particular, in a metal field, dense and diverse modeled articles have been obtained through use of a powder bed fusion system. The high denseness of a metal modeled article is achieved by effectively melting and solidifying metal powder. Based on success in the metal field, the development to ceramic materials has been discussed, and a large number of attempts have been reported. However, general ceramic materials, such as aluminum oxide ($Al_2O_3$) and zirconium oxide (ZrO and $ZrO_2$), hardly absorb laser light. Accordingly, in order to melt the general ceramic materials in the same manner as in metals, it is required to input more energy. However, laser light is diffused, and melting becomes non-uniform, and hence it is difficult to obtain the required modeling accuracy. In addition, the ceramic material has a high melting point. Accordingly, when the ceramic material is solidified after being melted with laser light, the ceramic material is rapidly cooled by the atmosphere and an adjacent peripheral portion. Due to the thermal stress generated in this case, a large number of cracks occur in a modeled article to be obtained. As a result, the mechanical strength of the modeled article to be obtained is insufficient.

Here, as one of important ceramic members used in various applications, there is given porous ceramics. The porous ceramics is excellent in heat resistance, chemical resistance, strength characteristics, light weight, and the like. Accordingly, through use of the passage function of a fluid (a liquid or a gas), the porous ceramics has been used in various kinds of filters, a separation column, a catalyst carrier, a lightweight structural material, a heat insulating material, a vacuum chuck member, and the like.

Under such circumstances, in Physics Procedia 5 (2010) 587-594, there is disclosed, as a method of manufacturing a three-dimensional modeled article of a direct modeling system, a technology of decreasing a melting point through use of ceramics having an $Al_2O_3$—$ZrO_2$ eutectic composition, to thereby reduce energy required for melting. In addition, in Physics Procedia 5 (2010) 587-594, there is disclosed a technology of irradiating ceramic material powder serving as a raw material with laser light while heating the ceramic material powder with a heater (preliminary heating) to alleviate thermal stress, to thereby suppress the occurrence of cracks in a modeled article to be obtained. According to this manufacturing method, there is an advantage in that a dense ceramic structure is obtained without shrinkage. However, part of the ceramic material powder in a portion that is not irradiated with laser light by preliminary heating with the heater is melted, and the accuracy of a surface boundary portion of the structure is not obtained, with the result that, for example, it is difficult to model a fine porous structure. Meanwhile, when the preliminary heating is not performed by giving priority to modeling accuracy, there is a problem in that cracks are formed by rapid cooling after the process as described above, and a porous structure having high strength is not obtained. Accordingly, with the above-mentioned technologies, it is difficult to obtain a ceramic modeled article having a porous structure that achieves both modeling accuracy and mechanical strength.

The present invention has been made in view of the above-mentioned problems, and an object of the present invention is to provide a method of manufacturing a ceramic article in which the mechanical strength of a ceramic modeled article including a porous portion manufactured with high modeling accuracy by taking advantage of the features of the direct modeling system is improved, and a ceramic article.

SUMMARY OF THE INVENTION

According to another aspect of the present invention, there is provided a method of manufacturing a ceramic article including the steps of: (i) irradiating powder of a metal oxide containing aluminum oxide as a main component with an energy beam based on modeling data to melt and solidify or sinter the powder, to thereby form a modeled article including a porous portion; (ii) causing the modeled article formed in the step (i) to absorb a liquid containing a zirconium component; and (iii) heating the modeled article that has absorbed the liquid containing the zirconium component, wherein, in the absorbing step, the liquid is absorbed so that a ratio of the zirconium component in a metal component contained in the porous portion becomes 0.3 mol % or more and 2.0 mol % or less.

According to another aspect of the present invention, there is provided a ceramic article including a metal oxide containing aluminum oxide as a main component and including a porous portion, wherein a ratio of a zirconium component in a metal component contained in the porous portion is 0.3 mol % or more and 2.0 mol % or less.

According to another aspect of the present invention, there is provided a ceramic article including a metal oxide containing aluminum oxide as a main component and including a dense portion and a porous portion, wherein a ratio of a zirconium component in a metal component contained in the porous portion is higher than a ratio of a zirconium component in a metal component contained in the dense portion.

Further features of the present invention will become apparent from the following description of exemplary embodiments with reference to the attached drawings.

DESCRIPTION OF THE EMBODIMENTS

Now, embodiments of the present invention are described with reference to the drawings, but the present invention is not limited to the following specific examples.

According to one aspect of the present invention, there is provided a method of manufacturing a ceramic article including a porous portion, the method including the steps of: (i) leveling powder of a metal oxide containing aluminum oxide ($Al_2O_3$) as a main component to form a powder layer; (ii) irradiating the powder layer with an energy beam based on modeling data to melt and solidify or sinter the powder; (iii) causing a modeled article including a porous portion, which is formed by repeating the step (i) and the step (ii), to absorb a liquid containing a zirconium (Zr) component; and (iv) heating the modeled article that has absorbed the liquid containing the zirconium component, wherein, in the absorbing step, the liquid is absorbed so that a ratio of the zirconium component in a metal component contained in the porous portion becomes 0.3 mol % or more and 2.0 mol % or less.

[Three-dimensional Modeled Article of Direct Modeling System]

The present invention is suitable for manufacturing an article through use of a direct modeling system. In particular, when the manufacturing method of the present invention is combined with a powder bed fusion system, a directional energy lamination system (so-called cladding system) involving building up a modeling material, and the like, the mechanical strength of a porous ceramic article can be significantly improved.

Figure 1A:
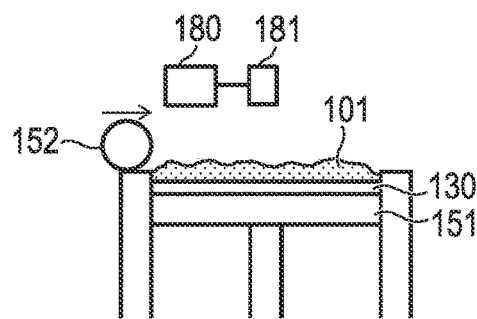
FIG. 1A is a schematic sectional view for schematically illustrating a method of manufacturing a modeled article that is a ceramic article according to one embodiment of the present invention.
Figure 1E:
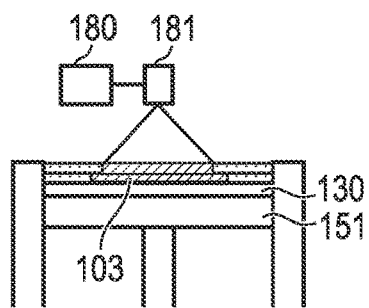
FIG. 1E is a schematic sectional view for schematically illustrating the method of manufacturing a modeled article that is a ceramic article according to the one embodiment of the present invention.
Figure 1B:
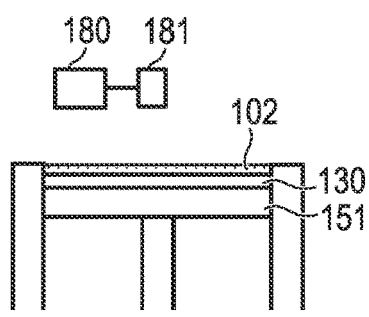
FIG. 1B is a schematic sectional view for schematically illustrating the method of manufacturing a modeled article that is a ceramic article according to the one embodiment of the present invention.
Figure 1F:
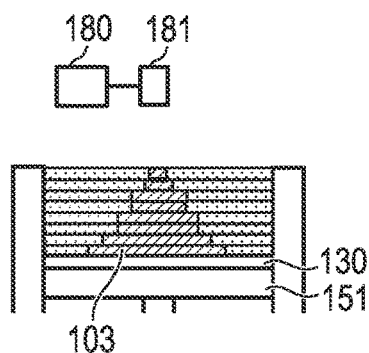
FIG. 1F is a schematic sectional view for schematically illustrating the method of manufacturing a modeled article that is a ceramic article according to the one embodiment of the present invention.
Figure 1C:
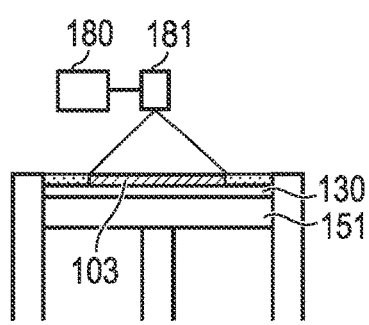
FIG. 1C is a schematic sectional view for schematically illustrating the method of manufacturing a modeled article that is a ceramic article according to the one embodiment of the present invention.
Figure 1G:
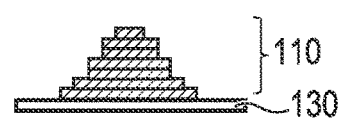
FIG. 1G is a schematic sectional view for schematically illustrating the method of manufacturing a modeled article that is a ceramic article according to the one embodiment of the present invention.
Figure 1D:
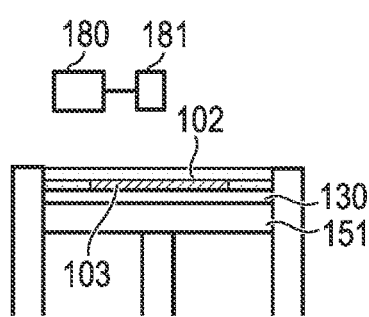
FIG. 1D is a schematic sectional view for schematically illustrating the method of manufacturing a modeled article that is a ceramic article according to the one embodiment of the present invention.
Figure 1H:
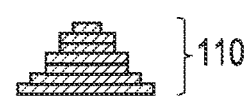
FIG. 1H is a schematic sectional view for schematically illustrating the method of manufacturing a modeled article that is a ceramic article according to the one embodiment of the present invention.

A basic flow of modeling of the powder bed fusion system is described with reference to FIG. 1A to FIG. 1H. First, a powder 101 is placed on a base 130, and a powder layer 102 is formed through use of a roller 152 (FIG. 1A and FIG. 1B). When the surface of the powder layer 102 is irradiated with an energy beam emitted from an energy beam source 180 in accordance with modeling data while being scanned with a scanner portion 181, the powder 101 is melted and then solidified to form a solidified portion 103 (FIG. 1C). Next, a stage 151 is lowered, and the powder layer 102 is newly formed on the above-mentioned solidified portion 103 and unsolidified powder (FIG. 1D). A series of those steps are repeatedly performed to form the solidified portion 103 having a desired shape (FIG. 1E and FIG. 1F). Finally, the unsolidified powder is removed. As required, an unnecessary portion is removed, and a modeled article and the base are separated from each other (FIG. 1G and FIG. 1H).

Figure 2A:
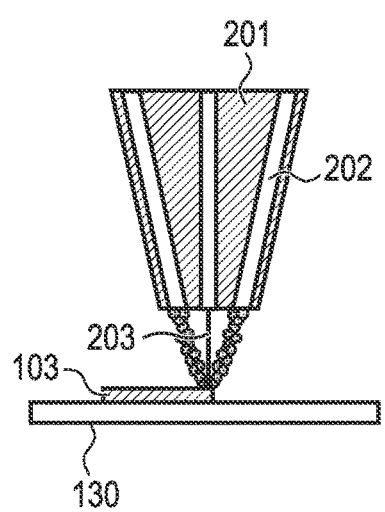
FIG. 2A is a schematic sectional view for schematically illustrating a method of manufacturing a modeled article that is a ceramic article according to one embodiment of the present invention.
Figure 2B:
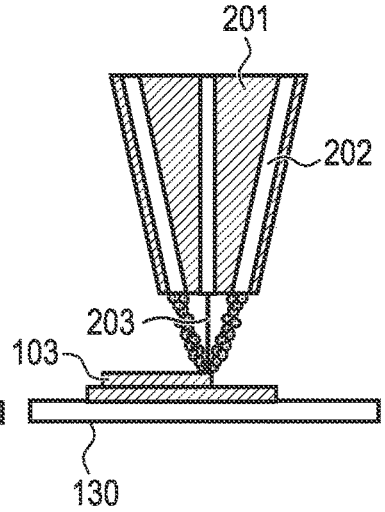
FIG. 2B is a schematic sectional view for schematically illustrating the method of manufacturing a modeled article that is a ceramic article according to the one embodiment of the present invention.
Figure 2C:
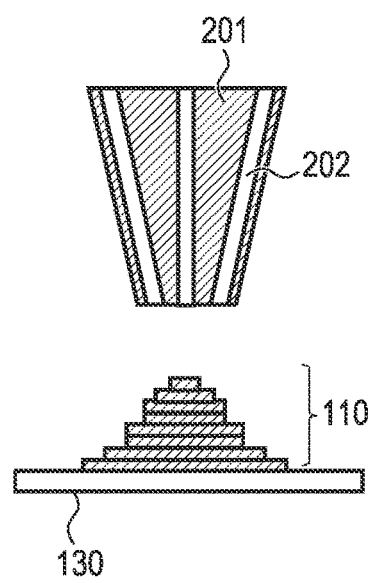
FIG. 2C is a schematic sectional view for schematically illustrating the method of manufacturing a modeled article that is a ceramic article according to the one embodiment of the present invention.

Next, the cladding system is described with reference to FIG. 2A to FIG. 2C. The cladding system is a procedure involving causing powder to be ejected from a plurality of powder supply holes 202 in a cladding nozzle 201, irradiating a region in which the powder is focused with an energy beam 203 to additionally form a solidified portion 103 at a desired place (FIG. 2A), and repeating those steps to obtain a modeled article 110 having a desired shape (FIG. 2B and FIG. 2C). Finally, as required, an unnecessary portion is removed, and the modeled article 110 and a base 130 are separated from each other.

[With Regard to Porous Portion]

According to the direct modeling system capable of obtaining a dense three-dimensional modeled article having a complicated shape, the modeled article 110 having various porous structures can be formed by inputting appropriate (three-dimensional) modeling data. When the modeled article 110 is fired by the manufacturing method of the present invention, a porous portion is formed, and a ceramic article including the porous portion can be obtained. The porous portion in the present invention refers to a portion having a plurality of open pores having a porosity of 5 vol (volume) % or more, a thickness of a bridge portion of 1 mm or less, and a pore diameter of 50 μm or more and 1,000 μm or less. Meanwhile, a dense portion in the present invention refers to a portion having a porosity of less than 5 vol (volume) % and a thickness of a bridge portion of 1 mm or more. Here, the porosity refers to a ratio of open pores to the volume of the ceramic article, and closed pores are excluded. The open pore refers to a pore that is partially connected to the outside (sometimes referred to as "open pore"). The closed pore refers to a pore that is not connected to the outside. In addition, a communication pore refers to a pore that is connected to the outside at both ends thereof, and is encompassed by the open pore. The porosity may be measured by a mercury injection method. In addition, the bridge portion refers to a structural portion forming pores in the porous portion, and the thickness of the bridge portion refers to the shortest distance between the pore and the pore adjacent thereto.

Figure 3:
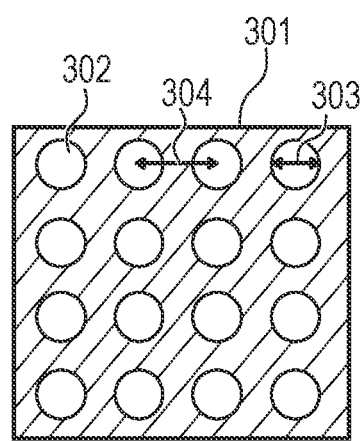
FIG. 3 is a schematic view of a ceramic article of the present invention when viewed from one surface thereof.

FIG. 3 is a schematic view of a porous ceramics 301 that is a ceramic article including a porous portion of the present invention, in which a partial region of a surface on which a sectional shape of each pore can be seen is enlarged. Here, the sectional shape refers to the shape of a surface of the pore perpendicular to an extending direction thereof. In FIG. 3, there is illustrated an example, and the present invention is not limited thereto. Although the pores each having a circular sectional shape are illustrated, the sectional shape of each of the pores may be any of a circular shape, a rectangular shape, and a triangular shape. Pores having a plurality of shapes may be formed in combination.

In the present invention, the porosity is a ratio of the open pores measured by the mercury injection method as described above. In the case of the porous ceramics 301 having the open pores 302 as illustrated in FIG. 3, the porosity is a ratio of the volume of the open pores 302 to the total volume including portions of the pores of the porous ceramics 301. The porous portion has a plurality of the open pores each having a pore diameter of 50 μm or more and 1,000 μm or less. In the present invention, a pore diameter 303 refers to a minor axis diameter ($2b$) of an elliptical shape (including a circular shape) obtained by approximating the contour of the pore. The method of approximating the contour of the pore to an elliptical shape is as follows. First, a maximum distance ($2a$) between contour portions in the contour of the pore and an area S in the contour of the pore are measured. A minor axis radius "b" of the approximated ellipse may be calculated by $b=S/(\pi a)$. As described above, the major axis diameter $2a$ and the minor axis diameter $2b$ are derived. The pore diameter may be measured through use of an optical microscope, a scanning electron microscope (SEM), or the like in an arbitrary cross-section that is substantially perpendicular to the open pore of the ceramic article.

An open pore pitch 304, an open pore shape, and the pore diameter 303, a porosity, and the like of the porous portion can be independently controlled by changing modeling data to be input. In addition, when the irradiation energy density of an energy beam is reduced, a porous portion having a random shape can be formed.

The average pore diameter is an average value of the pore diameters 303 of a plurality of pores in the porous portion. In the calculation of the average pore diameter, the open pores and the closed pores may be regarded as having substantially the same diameter, and the open pores and the closed pores may be measured and calculated without distinction. In the present invention, the average pore diameter of the pores in the porous portion is preferably 50 μm or more and 1,000 μm or less. The open pores and the closed pores cannot be distinguished from each other only by observing one arbitrary cross-section of the ceramic article with the optical microscope, the SEM, or the like. It can be examined whether a target pore is the open pore or the closed pore through slice and view involving observation with the SEM while cutting the target pore with a focused ion beam (FIB) or X-ray computed tomography (X-ray CT). The communication pore can also be observed by the same procedure.

Now, the pore diameter 303, the open pore pitch 304, and the porosity of the open pores 302 of the porous ceramics 301 illustrated in FIG. 3 are described. The case in which the open pores 302 each have a circular shape, and the open pore pitches 304 are provided with equal intervals is assumed. In the case where the open pore pitch is 1, when the porosity (vol %) is 5, 10, 20, 30, 40, 50, and 60, the pore diameter is 0.25, 0.36, 0.51, 0.62, 0.71, 0.80, and 0.87, respectively, and the thickness of the bridge portion is 0.75, 0.64, 0.50, 0.38, 0.29, 0.20, and 0.13, respectively.

The pore diameter 303 of the porous portion of the present invention may be constant in the extending direction of the pore, or may be changed in the middle. In addition, one pore may be divided into a plurality of pores in the middle. A plurality of open pores having different sectional shapes may be combined with each other. In any of the cases, in order to complete the porous portion, it is required to remove the unsolidified powder remaining in the pores after the modeling is completed. Accordingly, both ends of each of the pores communicate to the outside.

In the above-mentioned method of manufacturing a three-dimensional modeled article of the direct modeling system, the accuracy during modeling is about several tens of μm. For this reason, when the pore diameter of each of the pores to be formed in the porous portion is set to 50 μm or less, the uniform pore diameters 303 cannot be obtained, and the open pores 302 are filled up on the contrary, with the result that the porosity may be decreased. In addition, when the average pore diameter is more than 1,000 μm, the porous portion does not function as fine pores capable of controlling the flow of a gas or a liquid, and hence it is preferred that the average pore diameter be 1,000 μm or less. Accordingly, it is preferred that the average pore diameter of the open pores 302 be 50 μm or more and 1,000 μm or less. When the porous portion is formed for the purpose of reducing the weight, the preferred pore diameter is not limited to the foregoing as long as the desired mechanical strength can be obtained.

[Effect of Zirconium Component-containing Liquid]

In the case of the direct modeling system, such as the above-mentioned powder bed direct modeling system and the cladding system, the ceramics powder melted by irradiation with an energy beam is cooled and solidified by the surroundings to form a modeled article. In the case of ceramics, the difference between a melting temperature and a solidification temperature is large, and hence thermal stress is generated, and a large number of microcracks are generated in the modeled article. The microcracks are distributed over the entire modeled article (surface and inside). When the cross-section of the modeled article is checked with a scanning electron microscope or the like, most of the microcracks each have a width of from several nm to several μm. In addition, the lengths of the microcracks vary from several μm to several mm.

According to the present invention, the microcracks of the ceramic modeled article having a porous structure are caused to absorb a zirconium component-containing liquid, followed by heating. With this configuration, the microcracks are reduced, with the result that the mechanical strength of the modeled article can be improved.

When the cross-section of the modeled article obtained by causing the modeled article to absorb the zirconium-containing liquid, followed by heating, is observed, it is recognized that crystals of a zirconium composition are formed throughout the modeled article, and the mechanical strength of a ceramic article to be obtained is improved. The reason for this is conceived as follows. The aluminum oxide and the zirconium component that form the modeled article have a eutectic relationship, and hence microcracks are easily reduced in the heating step. Along with this, recrystallization proceeds, and the bonding force between crystal structures becomes strong, with the result that the mechanical strength of the ceramic article is improved. The following is assumed. The zirconium component is absorbed through the pores of the modeled article to adhere to the surfaces of the porous structure, the microcracks of the modeled article, and the like. Then, the zirconium component having adhered to the porous surface is diffused in a solid phase over a wide area within the crystals forming the modeled article by heating, and the crystals are recrystallized with the composition containing the zirconium component. It is conceived that, with such structure, the bonding force between the crystal structures of the ceramic article to be obtained becomes strong, and the mechanical strength is improved.

Accordingly, the present invention has a feature in that the zirconium component is introduced into the modeled article formed by melting and solidifying the powder with the energy beam. Even when the powder contains the zirconium component in advance, the occurrence of cracks during modeling cannot be suppressed, and hence the bonding strength between the crystal structures is not sufficient, with the result that the effect of the present invention (improvement in mechanical strength) is not obtained.

[Absorption Effect of Zirconium Component-containing Liquid by Porous Portion]

The difference in absorption effect of the zirconium component-containing liquid between the porous portion and the dense portion is described. Here, in the present invention, the porous portion and the dense portion have different porosities. The porosity of the porous portion is 5 vol % or more, and the porosity of the dense portion is less than 5 vol %. When the porosity of the porous portion is 5 vol % or more, the functions required as the porous portion, such as heat resistance, light weight, and utilization as a flow channel, can be obtained. In addition, when the porous portion has a porosity of 5 vol % or more, the zirconium component spreads to the inside of the porous portion of the modeled article, and sufficient strength can be obtained. The porosity of the porous portion is preferably 5 vol % or more and 60 vol % or less. It is preferred that the porosity of the porous portion be 60 vol % or less because sufficient strength as a ceramic article is obtained. The closed pores included in the porous portion do not substantially contribute to improvement in functions of the porous portion. In addition, the closed pores do not have a function of causing the zirconium component to spread to the inside of the modeled article. Accordingly, from the viewpoint of obtaining sufficient strength, the ratio of the closed pores included in the porous portion is preferably 1 vol % or less, more preferably 0.5 vol % or less.

In order to repair the microcracks that have occurred during modeling, it is required to cause the modeled article to absorb a sufficient amount of the zirconium component. In the ceramic modeled article including a porous portion, the zirconium component-containing liquid permeates the inside of the modeled article through the open pores. In addition, the porous portion has a large surface area, and hence a large amount of the zirconium component penetrates the porous portion as compared to the dense portion. In addition, the bridge portion forming the pores in the porous portion is fine and thin, and hence the zirconium concentration has a great influence on the modeling accuracy and the mechanical strength. Specifically, when the amount of the zirconium component to be absorbed by the porous portion is not controlled, enlargement of the structure containing the zirconium component and the like may occur in the subsequent heating step, which may lead to deterioration in modeling accuracy, and it is more difficult for the porous portion having a finer structure than that of the dense portion to satisfy both the modeling accuracy and the mechanical strength as compared to the dense portion. In view of the foregoing, in the present invention, it has been found that the modeling accuracy and the mechanical strength have a correlation with a Zr content, and the setting of the Zr content to an appropriate value is preferred in terms of achieving both the modeling accuracy and the mechanical strength.

First, regarding the mechanical strength, when the Zr content is low, the degree of improvement in mechanical strength is small, and the possibility that the porous portion becomes defective during processing or in the usage environment is increased. In the present invention, when the ratio of the zirconium component in the metal component forming the metal oxide in the porous portion is set to 0.3 mol % or more, the mechanical strength that is practically usable as a ceramic article is obtained.

Next, the modeling accuracy is described. When the content of the zirconium component added to the aluminum oxide serving as a main component becomes excessive, the melting point of the porous portion is decreased. Accordingly, a portion in which the crystals are melted occurs when the modeled article having absorbed zirconium is heated. Due to this, in particular, in the porous body, the fine bridge portion is easily deformed, and the modeling accuracy is lost to close the open pores, with the result that the resultant does not function as a porous body. Thus, from the viewpoint of modeling accuracy, it is required to control the Zr content in the porous portion more finely than in the dense portion. In the present invention, when the ratio of the zirconium component in the metal component forming the metal oxide in the porous portion is set to 2.0 mol % or less, the shape of the bridge portion is maintained, and sufficient modeling accuracy is obtained.

In view of the foregoing, in the present invention, in order to simultaneously achieve the modeling accuracy and the mechanical strength in the porous portion, the ratio of the zirconium component in the metal component forming the metal oxide in the porous portion is set to 0.3 mol % or more and 2.0 mol % or less. In addition, the ratio of the zirconium component in the metal component forming the metal oxide in the porous portion is preferably 0.3 mol % or more and 1.5 mol % or less.

Further, under this condition, it is preferred that the zirconium component become a metal oxide complexed with another metal component to form a zirconia region having an average circle-equivalent diameter of 5 µm or more on the surface of the bridge portion or in the inside. As the other metal component, for example, a gadolinium component is preferred. It is preferred that the gadolinium component be contained in an equimolar amount or more with respect to the zirconium component, and it is preferred that the zirconia region be formed of a metal oxide in which zirconium and gadolinium are complexed with each other. By virtue of such form, the high mechanical strength of the zirconium component is effectively imparted to the bridge portion and contributes to improvement in mechanical strength of the entire porous portion.

The method of manufacturing a ceramic article according to the present invention includes the following four steps (i) to (iv):

(i) leveling powder of a metal oxide containing aluminum oxide as a main component to form a powder layer;
(ii) irradiating the powder layer with an energy beam based on modeling data to melt and solidify or sinter the powder;
(iii) causing a modeled article including a porous portion, which is formed by repeating the step (i) and the step (ii), to absorb a liquid containing a zirconium component; and
(iv) heating the modeled article that has absorbed the liquid containing the zirconium component.

The above-mentioned liquid is absorbed in the absorbing step so that the ratio of the zirconium component in a metal component contained in the above-mentioned porous portion becomes 0.3 mol % or more and 2.0 mol % or less. In this case, the ratio of the zirconium component in the metal component contained in the porous portion is preferably 0.3 mol % or more and 1.5 mol % or less.

<Step (i)>

The method of manufacturing a modeled article according to the present invention includes the step (i) of leveling powder of a metal oxide containing aluminum oxide as a main component to form a powder layer.

Aluminum oxide is general-purpose structural ceramics. Through appropriate sintering or melting and solidification of aluminum oxide, a modeled article having high mechanical strength can be obtained.

It is preferred that the powder of the metal oxide in the present invention contain zirconium oxide at a content of less than 0.1 mol %. In addition, it is preferred that the ratio of the zirconium component in the metal component contained in the powder of the metal oxide be less than 0.15 mol %. In a modeled article having a porous structure that has absorbed a zirconium component-containing liquid, there is a large difference in concentration of the zirconium component between the crystal portion of the modeled article and the microcrack portion of the modeled article, and hence only the vicinity of the microcracks can be selectively melted. With this configuration, the deformation of the modeled article caused by the heating step can be suppressed.

It is more preferred that the powder in the present invention contain, as a sub-component, at least one kind selected from gadolinium oxide, terbium oxide, and praseodymium oxide. When the powder contains gadolinium oxide, the vicinity of the $Al_2O_3$—$Gd_2O_3$ eutectic composition has a melting point lower than that of aluminum oxide alone. As a result, the powder can be melted with small heat quantity, and the diffusion of energy in the powder is suppressed, with the result that the modeling accuracy is improved. In addition, when the powder contains gadolinium oxide, the modeled article has a phase separation structure formed of two or more phases. With this configuration, the extension of cracks is suppressed, and the mechanical strength of the modeled article is improved. Even when an oxide of another rare earth element (excluding terbium and praseodymium) is used instead of gadolinium oxide, the same effect as that in the case of gadolinium oxide can be obtained. When the energy beam is a laser beam, due to the sufficient energy absorption of the powder, the spread of heat in the powder is suppressed, and the heat is localized, to thereby reduce the influence of heat on a non-modeled portion, with the result that the modeling accuracy is improved. For example, when a Nd:YAG laser is used, it is more preferred that terbium oxide ($Tb_4O_7$), praseodymium oxide ($Pr_6O_{11}$), or the like be contained in the powder as a sub-component because terbium oxide ($Tb_4O_7$), praseodymium oxide ($Pr_6O_{11}$), or the like exhibits satisfactory energy absorption.

The eutectic composition ratio between the rare earth oxide material formed of gadolinium oxide, terbium oxide, and praseodymium oxide, which is a sub-component, and aluminum oxide is 46:54 (mol %), and hence it is preferred that the composition ratio between the rare earth oxide material and the aluminum oxide fall within a range of the above-mentioned eutectic composition ratio+5 mol %, that is, from 41:59 to 51:49 (mol %). Within this range, the effect of decreasing the melting point through use of ceramics having a eutectic composition is obtained.

From the above-mentioned viewpoints, the powder is more suitably, for example, $Al_2O_3$—$Gd_2O_3$, $Al_2O_3$—$Tb_4O_7$, $Al_2O_3$—$Gd_2O_3$—$Tb_4O_7$, $Al_2O_3$—$Pr_6O_{11}$, $Al_2O_3$—$Gd_2O_3$—$Pr_6O_{11}$, or $Al_2O_3$—$Gd_2O_3$—$Tb_4O_7$—$Pr_6O_{11}$.

A material for the base to be used in the present invention may be appropriately selected and used from materials, such as ceramics, metal, and glass, that are generally used in manufacturing of three-dimensional modeled articles in consideration of the application, manufacturing conditions, and the like of the modeled article. In the step (iv), when the modeled article integrated with the base is heated, it is preferred to use ceramics having heat resistance for the base.

The method of arranging the powder on the base is not particularly limited. In the case of the powder bed fusion system, as illustrated in FIG. 1A to FIG. 1H, the powder is arranged in layers on the base with a roller, a blade, or the like. In the case of the cladding system, as illustrated in FIG. 2A to FIG. 2C, the powder is sprayed and supplied from the nozzle to an irradiation position of an energy beam so that the powder is arranged in the form of being built up on the base or the modeled article arranged on the base. Simultaneously with this, the powder is melted by irradiation with an energy beam and solidified to produce the modeled article.

<Step (ii)>

The method of manufacturing a modeled article according to the present invention includes the step (ii) of irradiating the powder layer formed in the step (i) with an energy beam based on modeling data to melt and solidify or sinter the powder. Now, this step is described by way of a preferred embodiment.

In the case of the powder bed fusion system, as illustrated in FIG. 1A to FIG. 1H, the powder is melted by irradiating a predetermined region on the surface of the powder arranged on the base in the step (i) with the energy beam, and then is solidified. In the case of the cladding system, as illustrated in FIG. 2A to FIG. 2C, the powder is sprayed and supplied so that the powder is arranged in the form of being built up on the base in the step (i). Simultaneously with this, the entirety of the arranged powder is irradiated with the energy beam to be melted and solidified. When the powder is irradiated with the energy beam, the powder absorbs energy, and the energy is converted into heat to melt the powder. When the irradiation with the energy beam is completed, the melted powder is cooled and solidified by the atmosphere and an adjacent peripheral portion thereof, and thus a modeled article is formed. Due to the rapid cooling in the melting and solidification process, stress is generated in the surface layer and inside of the modeled article, and an infinite number of microcracks are formed. The modeled article may be formed by irradiating the powder layer with an energy beam to sinter the powder layer.

As the energy beam to be used, a light source having an appropriate wavelength is selected in consideration of the absorption characteristics of the powder. In order to perform modeling with high accuracy, it is preferred to adopt a laser beam or an electron beam which can be reduced in beam diameter and has high directivity. As a general-purpose energy beam, there are given laser beams, such as a YAG laser and a fiber laser each having a 1 μm wavelength band, and a $CO_2$ laser having a 10 μm wavelength band. When the powder contains terbium oxide or praseodymium oxide as a sub-component, the YAG laser having a 1 μm wavelength band is suitable.

<Step (iii)>

The method of manufacturing a modeled article according to the present invention includes the step of causing a modeled article, which is formed by repeating the step (i) and the step (ii), to absorb a liquid containing a zirconium component (sometimes referred to as "zirconium component-containing liquid").

The powder is newly arranged through the step (i) on the modeled article obtained in the step (ii). When the arranged powder is irradiated with the energy beam, the powder in the energy beam irradiation portion is melted and solidified to form a new modeled article integrated with the previous modeled article. Through alternate repetition of the step (i) and the step (ii), a modeled article having a desired three-dimensional shape is obtained.

Then, the obtained modeled article is caused to absorb a liquid containing a zirconium component (sometimes referred to as "zirconium component-containing liquid").

Here, the zirconium component-containing liquid is described. A preferred example thereof is a zirconium component-containing liquid formed of a raw material for a zirconium component, an organic solvent, and a stabilizer.

Various zirconium compounds may each be used as the raw material for the zirconium component. In the case of causing a modeled article containing alumina as a main component to absorb the liquid containing a zirconium component, a raw material that does not contain a metal element other than zirconium is preferred. As the raw material for the zirconium component, metal alkoxides, chlorides, and salt compounds, such as nitrates, of zirconium may be used. Of those, the metal alkoxide is preferred because, when the metal alkoxide is used, the zirconium component-containing liquid can be uniformly absorbed by the microcracks of the modeled article. Specific examples of the zirconium alkoxide include zirconium tetraethoxide, zirconium tetra-n-propoxide, zirconium tetraisopropoxide, zirconium tetra-n-butoxide, and zirconium tetra-t-butoxide.

First, a zirconium alkoxide is dissolved in an organic solvent to prepare a solution of the zirconium alkoxide. The addition amount of the organic solvent added to the zirconium alkoxide is preferably 5 or more and 30 or less in terms of a molar ratio with respect to the compound. The addition amount is more preferably 10 or more and 25 or less. In addition, in the present invention, the addition amount of A being 5 in terms of a molar ratio with respect to B means that the molar quantity of M to be added is 5 times as large as that of B. When the concentration of the zirconium alkoxide in the solution is extremely low, the modeled article cannot absorb a sufficient amount of a zirconium component. Meanwhile, when the concentration of the zirconium alkoxide in the solution is extremely high, the zirconium component in the solution is aggregated, and the zirconium component cannot be uniformly arranged in the microcrack portion of the modeled article.

As the organic solvent, alcohols, carboxylic acids, aliphatic or alicyclic hydrocarbons, aromatic hydrocarbons, esters, ketones, ethers, or mixed solvents of two or more kinds thereof are used. Preferred examples of the alcohols include methanol, ethanol, 2-propanol, butanol, 2-methoxyethanol, 2-ethoxyethanol, 1-methoxy-2-propanol, 1-ethoxy-2-propanol, 1-propoxy-2-propanol, 4-methyl-2-pentanol, 2-ethylbutanol, 3-methoxy-3-methylbutanol, ethylene glycol, diethylene glycol, and glycerin. Preferred examples of the aliphatic or alicyclic hydrocarbons include n-hexane, n-octane, cyclohexane, cyclopentane, and cyclooctane. Preferred examples of the aromatic hydrocarbons include toluene, xylene, and ethylbenzene. Preferred examples of the esters include ethyl formate, ethyl acetate, n-butyl acetate, ethylene glycol monomethyl ether acetate, ethylene glycol monoethyl ether acetate, and ethylene glycol monobutyl ether acetate. Preferred examples of the ketones include acetone, methyl ethyl ketone, methyl isobutyl ketone, and cyclohexanone. Examples of the ethers include dimethoxyethane, tetrahydrofuran, dioxane, and diisopropyl ether. In preparing the zirconium component-containing liquid to be used in the present invention, it is preferred that, of the various solvents described above, the alcohols be used from the viewpoint of the stability of the solution.

Next, the stabilizer is described. The zirconium alkoxide is highly reactive with water, and hence is abruptly hydrolyzed by moisture in air and addition of water, resulting in cloudiness and precipitation of the solution. In order to prevent the cloudiness and precipitation of the solution, it is preferred to add the stabilizer to stabilize the solution. Examples of the stabilizer may include: β-diketone compounds, such as acetylacetone, 3-methyl-2,4-pentanedione, 3-ethyl-2,4-pentanedione, and trifluoroacetylacetone; β-ketoester compounds, such as methyl acetoacetate, ethyl acetoacetate, butyl acetoacetate, allyl acetoacetate, benzyl acetoacetate, isopropyl acetoacetate, tert-butyl acetoacetate, isobutyl acetoacetate, ethyl 3-oxohexanoate, ethyl 2-methylacetoacetate, ethyl 2-fluoroacetoacetate, and 2-methoxyethyl acetoacetate; and alkanolamines, such as monoethanolamine, diethanolamine, and triethanolamine. The addition amount of the stabilizer is preferably 0.1 or more and 3 or less in terms of a molar ratio with respect to zirconium alkoxide. The addition amount is more preferably 0.5 or more and 2 or less.

Another preferred example is a zirconium component-containing liquid formed of particles of a zirconium component, a dispersant, and a solvent.

As the particles of the zirconium component, zirconium particles or zirconia particles serving as an oxide thereof may be used. The zirconium particles or zirconia particles may be produced by crushing each material by a top-down method, or may be synthesized from a metal salt, a hydrate, a hydroxide, a carbonate, or the like through use of a procedure such as a hydrothermal reaction by a bottom-up method. Alternatively, a commercially available product may be used. The size of each of the particles is 300 nm or less, more preferably 50 nm or less in order to cause the particles to penetrate the microcracks.

The shape of the fine particles is not particularly limited, and may be a spherical shape, a granular shape, a columnar shape, an elliptical spherical shape, a cubic shape, a rectangular parallelepiped shape, a needle shape, a columnar shape, a plate shape, a scale shape, or a pyramid shape.

The dispersant preferably contains at least one kind of an organic acid, a silane coupling agent, and a surfactant. The organic acid is preferably, for example, acrylic acid, 2-hydroxyethyl acrylate, 2-acryloxyethyl succinate, 2-acryloxyethyl hexahydrophthalate, 2-acryloxyethyl phthalate, 2-methyl hexanoate, 2-ethyl hexanoate, 3-methyl hexanoate, or 3-ethyl hexanoate. The silane coupling agent is preferably, for example, 3-acryloxypropyltrimethoxysilane, 3-methacryloxypropyltrimethoxysilane, hexyltrimethoxysilane, octyltriethoxysilane, or decyltrimethoxysilane. The surfactant is preferably, for example, an ionic surfactant, such as sodium oleate, fatty acid potassium, a sodium alkylphosphoric acid ester, an alkylmethylammonium chloride, or an alkylaminocarboxylic acid salt, or a non-ionic surfactant, such as a polyoxyethylene lauric fatty acid ester or a polyoxyethylene alkylphenyl ether.

An alcohol, a ketone, an ester, an ether, an ester-modified ether, a hydrocarbon, a halogenated hydrocarbon, an amide, water, an oil, or a mixed solvent of two or more kinds thereof is used as the solvent. The alcohol is preferably, for example, methanol, ethanol, 2-propanol, isopropanol, 1-butanol, or ethylene glycol. The ketone is preferably, for example, acetone, methyl ethyl ketone, methyl isobutyl ketone, or cyclohexanone. The ester is preferably, for example, ethyl acetate, propyl acetate, butyl acetate, 4-butyrolactone, propylene glycol monomethyl ether acetate, or methyl 3-methoxypropionate. The ether is preferably, for example, ethylene glycol monomethyl ether, diethylene glycol monobutyl ether, butyl carbitol, 2-ethoxyethanol, 1-methoxy-2-propanol, or 2-butoxyethanol. The modified ether is preferably, for example, propylene glycol monomethyl ether acetate. The hydrocarbon is preferably, for example, benzene, toluene, xylene, ethylbenzene, trimethylbenzene, hexane, cyclohexane, or methylcyclohexane. The halogenated hydrocarbon is preferably, for example, dichloromethane, dichloroethane, or chloroform. The amide is preferably, for example, dimethylformamide, N,N-dimethylacetamide, or N-methylpyrrolidone. The oil is preferably, for example, a mineral oil, a plant oil, a wax oil, or a silicone oil.

The zirconium component-containing liquid may be produced by simultaneously mixing the zirconium particles or zirconia particles with the dispersant and the solvent, or may be produced by mixing the zirconium particles or zirconia particles and the dispersant and then mixing the solvent with the mixture. Alternatively, the zirconium component-containing liquid may be produced by mixing the zirconium or zirconia fine particles with the solvent and then mixing the dispersant with the mixture, or may be produced by mixing the dispersant and the solvent with each other and then mixing the zirconium or zirconia fine particles with the mixture. The solution may be prepared through reaction or refluxing at room temperature.

The solid content concentration of the zirconia component is determined based on the molar ratio of the zirconium alkoxide, the organic solvent, and the stabilizer described above. The weight ratio of the zirconia solid content falls within a range of preferably from 3% to 20%, more preferably from 8% to 15%. When the concentration is low, the effect of filling the microcracks is not easily obtained. When the weight ratio is 3% or more, the effect is obtained to some extent. When the weight ratio is 8% or more, the effect is further enhanced. When the weight ratio is high, the viscosity becomes too high, and the liquid is not easily absorbed by the microcracks, with the result that the effect is not easily obtained. When the weight ratio is 20% or less, the effect is obtained to some extent. When the weight ratio is 15% or less, the effect is further enhanced.

The powder melted by irradiation with an energy beam in the step (ii) is cooled and solidified by the surroundings to form an intermediate modeled article. In the case of ceramics, the difference in temperature between melting and solidification is large, and hence a large number of microcracks are generated in the intermediate modeled article.

The zirconium component-containing liquid penetrates not only the surface layer of the modeled article but also the inside of the modeled article through the microcracks and is distributed through the step (iii). As long as a sufficient amount of the zirconia component can be interposed within a sufficient range of the microcracks of the modeled article, the procedure for causing the modeled article to absorb the zirconium component-containing liquid is not particularly limited. The modeled article may be impregnated with the zirconium component-containing liquid, or the zirconium component-containing liquid may be sprayed onto the intermediate modeled article in the form of a mist or applied to the surface with a brush or the like. In addition, a plurality of those procedures may be combined with each other, or the same procedure may be repeated a plurality of times. In the case of spraying the zirconium component-containing liquid or applying the zirconium component-containing liquid, it is preferred to spray or apply the zirconium component-containing liquid in an amount of 5 vol % or more and 20 vol % or less of the modeled article that has not absorbed the zirconium component-containing liquid. When the amount is less than 5 vol %, the amount of the zirconium component to be arranged in the microcrack portion of the modeled article is insufficient, and there is a risk in that the microcrack portion may not be melted. In the case where the amount is more than 20 vol %, when the step (i) is performed after the step (iii), there is a risk in that it may be difficult to uniformly arrange the powder on the modeled article due to the influence of the zirconium component-containing liquid. In the case of a modeled article having a large volume that is obtained by repeating the steps (i) and (ii) to form a modeled article including a porous portion, a procedure involving immersing the modeled article in the zirconium component-containing liquid and degassing the modeled article under reduced pressure, to thereby impregnate the modeled article with the zirconium component-containing liquid, is preferred. Alternatively, it is preferred that while the steps (i) and (ii) are repeated to form a modeled article including a porous portion, the zirconium component-containing liquid be sprayed in the form of a mist to be absorbed by the modeled article at each stage.

<Step (iv)>

In the step (iv) of the method of manufacturing a modeled article according to the present invention, the modeled article having absorbed the zirconium component-containing liquid is heated.

In the step (iii), the zirconium component-containing liquid is distributed in the surface layer of the modeled article and the microcracks in the modeled article.

As described above, the zirconium component and aluminum oxide have a eutectic relationship, and hence melting starts at a eutectic point in a portion in which these components are present. For example, the eutectic point of aluminum oxide and zirconium oxide is about 1,900° C., which is lower than the melting point of each component alone (the melting point of $Al_2O_3$ is 2,070° C., and the melting point of $ZrO_2$ is 2,715° C.). Specifically, melting starts at a temperature lower than the melting temperature of the modeled article containing aluminum oxide as a main component. That is, the melting point at a location in which zirconium is present can be greatly decreased locally, and only the vicinity of the microcracks is selectively melted locally by heating at a temperature equal to or more than the eutectic point and less than the melting point of the modeled article through use of the difference in melting point. Specifically, the modeled article that has undergone the step (iv) is heated so that the maximum temperature reaches 1,600° C. or more and 1,710° C. or less.

When the temperature of the microcrack portion reaches the maximum temperature of from 1,600° ° C. to 1,710° ° C., the microcrack portion in which the zirconium component is present is melted. Accordingly, the heating time does not matter. In the molten state, the diffusion of atoms proceeds in a direction in which the surface energy is reduced, and eventually microcracks are reduced or eliminated. Through control of the heating temperature, only the vicinity of the portion in which the zirconium component is present can be melted. As a result, the advantage of the direct modeling method is secured without destroying the shape of the modeled article. Accordingly, the shape of the modeled article is maintained even through heating for a long period of time. The mechanical strength of the modeled article that has been solidified and recrystallized after melting is significantly improved by virtue of the reduction or elimination of microcracks.

When a sufficient zirconia component is interposed in the microcrack portion, there is the effect that the vicinity of the microcracks is melted to reduce or eliminate the microcracks as described above. In particular, when the vicinity of the microcracks approaches a eutectic composition in which zirconium oxide is in the vicinity of 22 mol % with respect to 78 mol % of the modeled article containing aluminum oxide as a main component, the vicinity of the microcracks is more easily melted. When the vicinity of the microcracks is melted to reduce or eliminate the microcracks, it is preferred to perform heating at a temperature of 1,650° C. or more and 1,710° C. or less. It is more preferred to perform heating at a temperature of from 1,662° ° C. to 1,670° C.

The heating method for the modeled article is not particularly limited. The modeled article that has absorbed the zirconium component-containing liquid may be heated again by irradiation with an energy beam, or may be heated in an electric furnace. When the modeled article is heated with an energy beam, it is required to grasp in advance the relationship between the input heat quantity of the energy beam and the temperature of the modeled article through use of a thermocouple or the like so that the modeled article is heated to the above-mentioned preferred temperature.

In the heating step, the modeled article may stick to a setter due to melting of the surface layer of the modeled article and the vicinity of the microcracks. Accordingly, when the modeled article is arranged on the setter in the heating step, it is preferred that the setter be inactive. As the inactive setter, for example, platinum or the like may be applied in the atmospheric atmosphere, and iridium or the like may be applied in a low oxygen atmosphere.

<Flow of Respective Steps>

Now, the order of the respective steps and repetition pattern examples are described.

The basic flow is basically a flow of performing each step in the order of step (i)→step (ii)→step (iii)→step (iv), but the step (iii) and the step (iv) may be repeatedly performed.

It is preferred to cause the vicinity of the microcracks of the modeled article to approach the eutectic composition in which zirconium oxide is in the vicinity of 22 mol % with respect to 78 mol % of the modeled article containing aluminum oxide as a main component by repeatedly performing the step (iii) and the step (iv). With this configuration, the vicinity of the microcracks is easily melted, and the effect of reducing or eliminating the microcracks is improved. In this case, the above-mentioned liquid is absorbed in the above-mentioned absorbing step so that the ratio of the zirconium component to the metal component contained in the porous portion becomes 0.3 mol % or more and 2.0 mol % or less.

[Composite Ceramic Component Including Porous Portion and Dense Portion]

Figure 7:
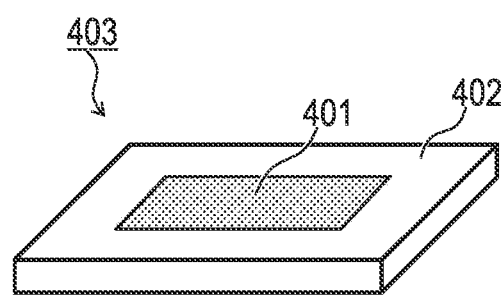
FIG. 7 is a schematic view for schematically illustrating a piece of composite ceramic component including a porous portion and a dense portion according to the present invention.

FIG. 7 is a schematic view of an example of a piece of composite ceramic component 403 including a porous portion 401 and a dense portion 402 configured to hold the porous portion 401. In FIG. 7, the porous portion 401 is surrounded by the dense portion 402 and integrated therewith. The composite ceramic component 403 may be used as an adsorption plate by coupling an intake and exhaust member thereto. The example of FIG. 7 is merely an example. A plurality of porous portions 401 may be independently arranged in the dense portion 402, or the dense portion 402 may be arranged inside the porous portion 401.

In the present invention, the dense portion 402 forming the composite ceramic component 403 is made of a metal oxide containing aluminum and zirconium, and the ratio of a zirconium component in a metal component forming the above-mentioned metal oxide is smaller than that of the porous portion 401.

EXAMPLES

Now, the method of manufacturing a modeled article according to the present invention is described in detail by way of Examples, but the present invention is not limited to Examples below.

Example 1

In this Example, a porous portion having a lattice-like pattern was produced. The porous portion roughly corresponds to the case in which the lattice-like pattern has a pore pitch of 175 μm.

<Step (i), Step (ii), and Step (iii)>

α-$Al_2O_3$ powder, $Gd_2O_3$ powder, and $Tb_2O_{3.5}$ powder ($Tb_4O_7$ powder) were prepared, and the powders were weighed so that the molar ratio was $Al_2O_3$:$Gd_2O_3$:$Tb_2O_{3.5}$=77.4:20.8:1.8. The weighed powders were mixed with a dry ball mill for 30 minutes to obtain mixed powder (material powder).

When the composition of the above-mentioned material powder was analyzed by ICP emission spectroscopic analysis, the content of zirconium oxide was less than 0.1 mol %.

Next, a modeled article of Example 1 was formed through basically the same steps as those illustrated in FIG. 1A to FIG. 1H described above.

For formation of the modeled article, ProX DMP 100 (product name) manufactured by 3D SYSTEMS, having a 50 W Nd:YAG laser (beam diameter: 65 μm) mounted thereon, was used.

First, a first powder layer having a thickness of 20 μm formed of the above-mentioned material powder was formed on a pure alumina base through use of a roller (step (i)). Then, the above-mentioned powder layer was irradiated with a laser beam of 30 W to melt and solidify material powder in a square region of 10 mm×10 mm into a network shape. The drawing speed was set to 180 mm/s, and the drawing pitch was set to 175 μm (step (ii)). Drawing lines were each positioned diagonally at an angle of 45° with respect to each side of the square. Next, a powder layer having a thickness of 20 μm was newly formed with the roller so as to cover the above-mentioned melted and solidified portion (step (i)). The powder layer right above the above-mentioned square region was irradiated with a laser under a state in which the laser was orthogonal to the drawing lines of the first layer, to thereby melt and solidify the powder in the region of 10 mm×10 mm (step (ii)).

Through such repeating step (iii), a modeled article having a bottom surface of 10 mm×10 mm and a height of 3 mm was formed. The obtained modeled article contained unsolidified powder, and the unsolidified powder was removed to obtain a modeled article having a porous structure.

<Step (iv)>

The zirconium component-containing liquid was prepared as described below. A solution in which 85 wt % of zirconium (IV) butoxide (hereinafter referred to as "Zr(O-n-Bu)$_4$") was dissolved in 1-butanol was prepared. The above-mentioned solution of Zr(O-n-Bu)$_4$ was dissolved in 2-propanol (IPA), and ethyl acetoacetate (EAcAc) was added to the resultant as a stabilizer. The molar ratio of each component was set to Zr(O-n-Bu)$_4$:IPA:EAcAc=1:15:2. Then, the resultant was stirred at room temperature for about 3 hours to prepare a zirconium component-containing liquid. The weight concentration of the zirconia solid content of this liquid is 8%.

The above-mentioned modeled article processed for the test was immersed in the zirconium component-containing liquid and degassed under reduced pressure for 1 minute to cause the zirconium component-containing liquid to permeate (impregnate) up to the inside of the modeled article, followed by natural drying for 1 hour.

The modeled article impregnated with (having absorbed) the zirconium component-containing liquid as described above was arranged on a platinum wire provided on an alumina plate, and the resultant was placed in an electric furnace for heating. Specifically, the temperature was increased to 1,670° C. in the atmospheric atmosphere in 2.5 hours and kept at 1,670° ° C. for 50 minutes. After that, the energization was completed, and the modeled article was cooled to 200° C. or less in 1.5 hours (step (iv)).

In Example 1, the step of causing the modeled article to absorb the zirconium component-containing liquid (step (iii)) and the heating step (step (iv)) were alternately repeated five times each to obtain a ceramic article including a porous portion.

<Evaluation>

[Evaluation Method]

The average pore diameter was evaluated by the following procedure. A SEM image of a surface obtained by abrading a modeled article including a porous portion is acquired by a scanning electron microscope (SEM). The average pore diameter is calculated as described below. First, for respective pores, an area S and a maximum distance (2a) between contour portions of the pore are obtained from the SEM image, and b=S/(πa) is calculated. An average value of minor axis diameters of ellipses each having a major axis diameter 2a and a minor axis diameter 2b thus obtained is defined as an average pore diameter. The average pore diameter as described herein is synonymous with the foregoing.

In addition, the porosity was measured by a mercury injection method. Accordingly, the porosity in the present invention refers to a ratio of open pores to the volume of the ceramic article, and closed pores are excluded.

The Zr content and the average particle diameter of a Zr region were evaluated by the following procedures. Composition analysis of the porous portion was performed in an area of 2 mm×2 mm by SEM-EDX analysis, and the ratio of a Zr component in all metal elements was defined as a Zr content. For the average particle diameter, the composition distribution of the porous portion was mapped in the same area. The continuous region containing the Zr component as a main component was regarded as one zirconia region, and the area thereof was calculated. The diameter of a circle corresponding to the area (circle-equivalent diameter) was calculated. The circle-equivalent diameter was calculated for a plurality of zirconia regions, and the average value thereof was defined as the average circle-equivalent diameter of the zirconia regions.

Modeling accuracy and mechanical strength were evaluated by the following procedures. The modeling accuracy refers to a difference between the dimensions of a ceramic article that has undergone a firing step after modeling and the design dimensions. In a modeled article of 10 mm×10 mm having a height of 3 mm, maximum values of change ratios on an upper surface of the modeled article in the step (iii) and the step (iv) are compared to each other, and the change ratios are ranked as A, B, and C in the order of satisfactory change ratios. Specifically, a change ratio of 3% or less is ranked as modeling accuracy A, a change ratio of more than 3% and 5% or less is ranked as modeling accuracy B, a change ratio of more than 5% is ranked as modeling accuracy C, and a modeled article that is not practically usable due to the occurrence of damage and the like is ranked as modeling accuracy D. Specifically, the modeled article having the modeling accuracy A had an upper surface dent of 0.3 mm or less. The modeled article having the modeling accuracy B had an upper surface dent falling within a range of more than 0.3 mm and 0.5 mm or less. The modeled article having the modeling accuracy C had an upper surface dent of more than 0.5 mm.

The mechanical strength was measured as described below. First, there was acquired a SEM image 1 of a sample surface which was abraded through use of No. 250 to No. 15,000 abrasive paper and finally through use of No. 15,000 lapping film abrasive paper after impregnation and firing of the porous portion (step (iv)). Subsequently, the sample for which the SEM image 1 had been acquired was placed on a No. 600 diamond polishing disc (manufactured by Musashino Denshi, Inc.) configured to rotate at 80 rpm, cut by application of a load of 0.5 kg, and a SEM image 2 of the sample was acquired. The case in which a defect ratio of the SEM image 2 to the SEM image 1 was 10% or less was ranked as mechanical strength A. The case in which a defect ratio of the SEM image 2 to the SEM image 1 was more than 10% and 20% or less was ranked as mechanical strength B. The case in which a defect ratio of the SEM image 2 to the SEM image 1 was more than 20% was ranked as mechanical strength C.

[Evaluation Results]

Figure 4A:
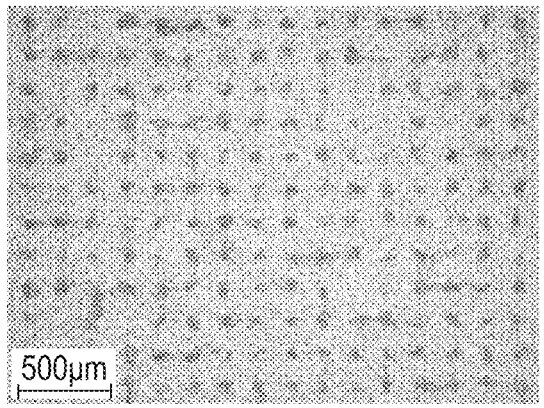
FIG. 4A is an optical microscopic image of a modeled article that is a ceramic article of the present invention.
Figure 5A:
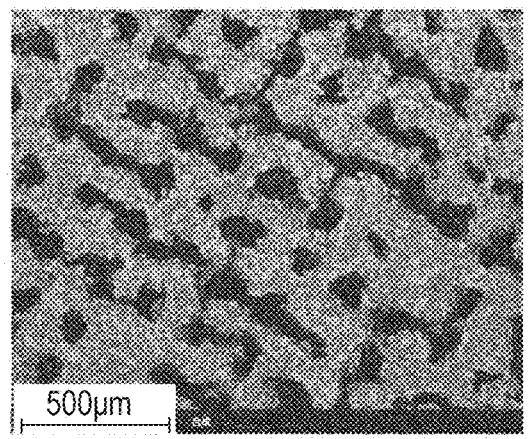
FIG. 5A is a SEM image of the modeled article that is the ceramic article of the present invention.
Figure 5B:
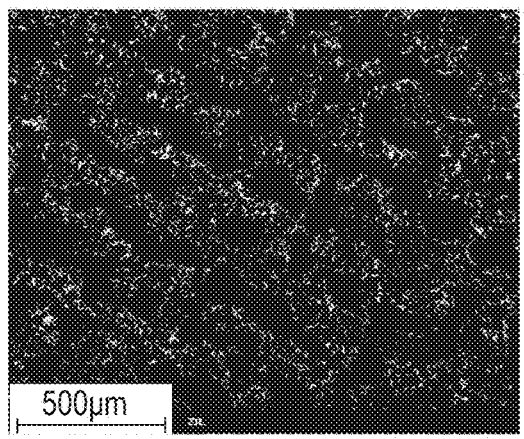
FIG. 5B is a distribution image of a Zr component of the modeled article that is the ceramic article of the present invention.

An optical microscopic image of the porous portion of the produced ceramic article is shown in FIG. 4A. A SEM image thereof is shown in FIG. 5A, and a mapping image of the composition distribution of a Zr component by SEM-EDX in the same region is shown in FIG. 5B. The obtained porous portion had open pores each communicating from one surface to the opposite surface. The average pore diameter in the porous portion was 115 µm, and the porosity was 31 vol %. The ratio of the closed pores was 0.4 vol %. The Zr content was 1.56 mol %. The average circle-equivalent diameter of the zirconia regions was 20 µm, and the zirconia regions were each distributed so as to extend from a bridge portion to the outside of the bridge portion. The porous portion of the obtained ceramic article had the modeling accuracy B and the mechanical strength A.

Example 2

This Example is an example in which the content of the zirconium component in the porous portion is different.

Porous ceramics was produced under the same conditions as those in Example 1 except that the immersion step in the zirconium component-containing liquid (step (iii)) and the heating step (step (iv)) were alternately repeated twice each. The produced porous ceramic article was evaluated in the same manner as in Example 1.

Example 3

This Example is an example in which the arrangement of open pores in the porous portion is random.

Figure 4B:
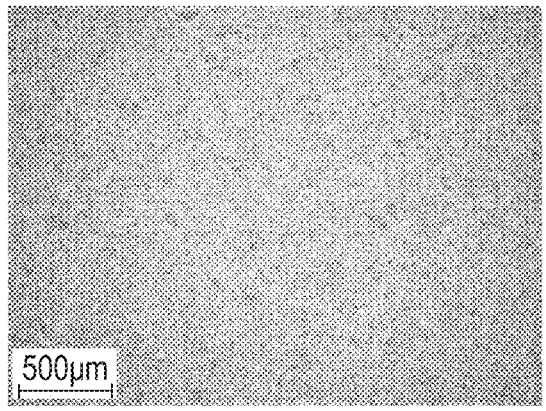
FIG. 4B is an optical microscopic image of the modeled article that is the ceramic article of the present invention.

A porous ceramic article was produced under the same conditions as those in Example 1 except that the drawing speed was set to 220 mm/s and the drawing pitch was set to 125 µm in order to obtain a porous portion having randomly arranged open pores. An optical microscopic image of the porous portion is shown in FIG. 4B. The produced porous ceramics was evaluated in the same manner as in Example 1.

Example 4

This Example is an example in which a composite ceramic component including a porous portion made of ceramics and a dense portion made of ceramics configured to hold the porous portion is produced. This example corresponds to the case in which the porous portion has a lattice-like pattern having a pore pitch of 175 µm, and the porous portion is surrounded by the dense portion and integrated therewith in FIG. 7.

Figure 6A:
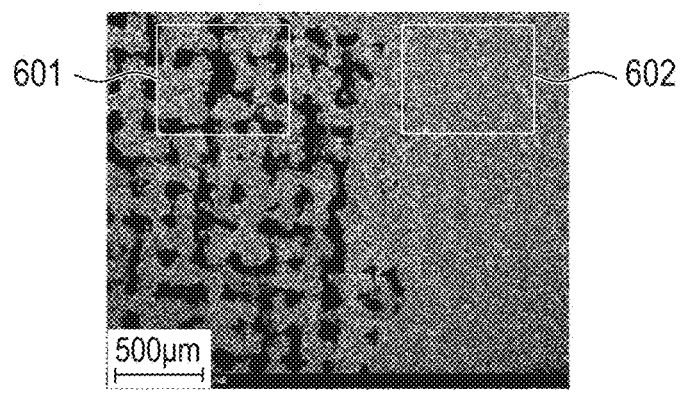
FIG. 6A is a SEM image of the modeled article that is the ceramic article of the present invention.
Figure 6B:
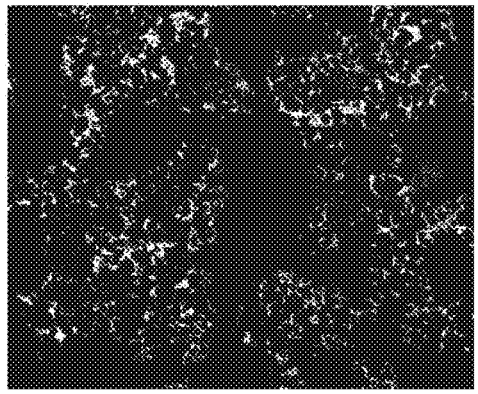
FIG. 6B is a distribution image of the Zr component in a porous portion of the modeled article that is the ceramic article of the present invention.
Figure 6C:
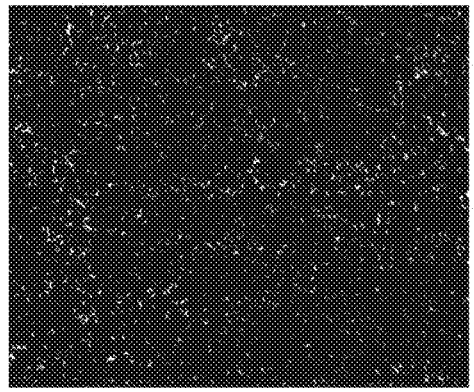
FIG. 6C is a distribution image of the Zr component in a dense portion of the modeled article that is the ceramic article of the present invention.

The porous portion was produced under the same laser irradiation conditions as those in Example 1. The dense portion was produced by irradiation of a laser beam of 30 W with a drawing speed of from 100 mm/s to 140 mm/s and a drawing pitch of 100 µm. A SEM image of a boundary between the porous portion and the dense portion of the obtained composite ceramic component is shown in FIG. 6A. In addition, mapping images of the composition distribution of the Zr component by SEM-EDX in regions corresponding to a part 601 of the porous portion and a part 602 of the dense portion shown in FIG. 6A are shown in FIG. 6B and FIG. 6C, respectively. The porous portion and the dense portion of the produced ceramic article were evaluated in the same manner as in Example 1.

Examples 5 to 8

These Examples are each an example in which the content of the zirconium component in the lattice-like porous portion is different. The conditions are the same as those in Example 1 except that the immersion step in the zirconium component-containing liquid was repeated three, four, six, and eight times, respectively.

Examples 9 to 14

These Examples are each an example in which the content of the zirconium component in the porous portion having random open pores is different. The conditions are the same as those in Example 3 except that the immersion step in the zirconium component-containing liquid is repeated two, three, four, six, seven, and eight times, respectively.

(Examples 15 and 16)

These Examples are each an example in which the content of the zirconium component in the composite ceramic component including the porous portion made of ceramics and the dense portion made of ceramics configured to hold the porous portion is different. The conditions are the same as those in Example 4 except that the immersion step in the zirconium component-containing liquid is repeated four and six times, respectively.

Comparative Examples 1 to 3

Porous ceramics was obtained in the same manner as in Example 1 except that the step of immersing an intermediate modeled article in the zirconium component-containing liquid (step (iii)) and the step of heating the intermediate modeled article having absorbed the zirconium component-containing liquid (step (iv)) were not performed in Comparative Example 1, these steps were performed once in Comparative Example 2, and these steps were performed eight times in Comparative Example 3. The produced ceramic articles each including a porous portion were evaluated in the same manner as in Example 1.

Comparative Example 4

This Comparative Example is an example in which the content of the zirconium component in the porous portion having random open pores is different. The conditions are the same as those in Example 3 except that the immersion step in the zirconium component-containing liquid is performed once.

Examples 17 to 19

These Examples are each an example in which the content of the zirconium component in the composite ceramic component including the porous portion and the dense portion configured to hold the porous portion is different. The conditions are the same as those in Example 4 except that the immersion step in the zirconium component-containing liquid is repeated two, three, and seven times, respectively.

Comparative Example 5

This Comparative Example is an example in which the content of the zirconium component in the composite ceramic component including the porous portion and the dense portion configured to hold the porous portion is different. The conditions are the same as those in Example 4 except that the immersion step in the zirconium component-containing liquid is repeated nine times.

The above-mentioned evaluation results of Examples and Comparative Examples are collectively shown in Table 1.

evaluation through SEM-EDX and XRD that most of the Zr component did not form zirconium oxide ($ZrO_2$) but formed a composite oxide with Gd.

In addition, as apparent from the results of Example 4 in Table 1 and FIG. 6B and FIG. 6C, when Zr impregnation was performed under the same conditions, the Zr content was higher in the porous portion than in the dense portion. The reason for this is conceived as follows: in the porous portion, the zirconium component-containing liquid permeates the inside of the modeled article through the open pores, and the porous portion has a large surface area, and hence a larger amount of the zirconium component permeates the porous portion as compared to the dense portion.

TABLE 1

| | Form of modeled article | Average pore diameter (μm) | Porosity (vol %) | Zr content (mol %) | Average particle diameter of Zr region (μm) | Number of times of Zr impregnation | Modeling accuracy | Mechanical strength |
|---|---|---|---|---|---|---|---|---|
| Example 1 | Porous portion (lattice shape) | 115 | 31 | 1.56 | 20 | 5 | B | A |
| Example 2 | Porous portion (lattice shape) | 120 | 33 | 0.58 | 12 | 2 | A | B |
| Example 3 | Porous portion (random) | 55 | 22 | 0.82 | 15 | 5 | A | A |
| Example 4 | Integrated form: Porous portion (lattice shape) | 112 | 31 | 1.48 | 20 | 5 | B | A |
| | Integrated form: dense portion | 12 | 2 | 0.44 | 5 | | A | B |
| Example 5 | Porous portion (lattice shape) | 118 | 33 | 0.91 | 14 | 3 | A | A |
| Example 6 | Porous portion (lattice shape) | 117 | 32 | 1.18 | 18 | 4 | A | A |
| Example 7 | Porous portion (lattice shape) | 107 | 31 | 1.78 | 24 | 6 | B | A |
| Example 8 | Porous portion (lattice shape) | 100 | 30 | 1.98 | 25 | 7 | B | A |
| Example 9 | Porous portion (random) | 61 | 25 | 0.31 | 10 | 2 | A | B |
| Example 10 | Porous portion (random) | 61 | 24 | 0.48 | 11 | 3 | A | B |
| Example 11 | Porous portion (random) | 58 | 23 | 0.63 | 12 | 4 | A | B |
| Example 12 | Porous portion (random) | 54 | 22 | 0.94 | 17 | 6 | A | A |
| Example 13 | Porous portion (random) | 54 | 21 | 1.07 | 18 | 7 | A | A |
| Example 14 | Porous portion (random) | 53 | 20 | 1.22 | 21 | 8 | A | A |
| Example 15 | Integrated form: Porous portion (lattice shape) | 117 | 33 | 1.16 | 17 | 4 | A | A |
| | Integrated form: dense portion | 13 | 2 | 0.36 | 3 | | A | B |
| Example 16 | Integrated form: Porous portion (lattice shape) | 105 | 31 | 1.8 | 25 | 6 | B | A |
| | Integrated form: dense portion | 12 | 2 | 0.53 | 7 | | A | B |
| Comparative Example 1 | Porous portion (lattice shape) | 130 | 35 | 0 | — | 0 | A | C |
| Comparative Example 2 | Porous portion (lattice shape) | 128 | 35 | 0.24 | 5 | 1 | A | C |
| Comparative Example 3 | Porous portion (lattice shape) | 65 | 28 | 2.4 | 40 | 8 | D | A |
| Comparative Example 4 | Porous portion (random) | 62 | 25 | 0.13 | 3 | 1 | A | C |
| Example 17 | Integrated form: Porous portion (lattice shape) | 119 | 34 | 0.62 | 12 | 2 | A | B |
| | Integrated form: dense portion | 14 | 3 | 0.21 | 2 | | A | B |
| Example 18 | Integrated form: Porous portion (lattice shape) | 118 | 33 | 0.91 | 15 | 3 | B | A |
| | Integrated form: dense portion | 13 | 2 | 0.28 | 3 | | A | B |
| Example 19 | Integrated form: Porous portion (lattice shape) | 92 | 30 | 2.02 | 30 | 7 | C | A |
| | Integrated form: dense portion | 11 | 2 | 0.62 | 11 | | A | B |
| Comparative Example 5 | Integrated form: Porous portion (lattice shape) | 61 | 25 | 2.54 | 45 | 9 | D | A |
| | Integrated form: dense portion | 10 | 2 | 0.9 | 13 | | A | A |

DISCUSSION

[With Regard to Zr Content and Zr Component]

When Example 1, Example 2, and Comparative Examples 1 to 3 were compared to each other, the Zr content was increased along with an increase in number of times of Zr impregnation (zero, one, two, five, and eight times) in the porous ceramic portion. It was found that the average particle size of the Zr region was also increased along with an increase in Zr content, and the precipitated crystal grains having an average particle diameter of 10 μm or more were combined to form a continuous network. It was found by the

[With Regard to Relationship between Zr Concentration, and Modeling Accuracy and Mechanical Strength]

The ceramic articles having the modeling accuracies A, B, and C had no damage and the like, and were practically usable as ceramic articles. In particular, the ceramic articles having the modeling accuracies A and B had satisfactory modeling accuracy and were each suitable as Example for obtaining a ceramic article having a complicated shape or a fine shape. Meanwhile, the comparative ceramic article having the modeling accuracy D had unsatisfactory modeling accuracy and had a large difference from the design dimensions. In addition, damage such as cracking was observed, and hence practical specifications were not able to be obtained.

The relationship between the zirconium content in the porous portion and the modeling accuracy is discussed by comparing Examples 1 to 3, Examples 5 to 14, and Comparative Examples 1 to 4 in each of which the ceramic article including only a porous portion was modeled. The modeling accuracy was satisfactory when Zr was not contained or when the Zr content was 1.5 mol % or less (0 mol %≤Zr≤1.5 mol %), and the change ratio between the dimensions of the ceramic article that has undergone the firing step after modeling and the design dimensions was 3% or less (modeling accuracy A). When the Zr content was increased, the modeling accuracy was decreased. When the Zr content fell within a range of 1.5 mol %<Zr≤2.0 mol %, the change ratio became more than 3% and 5% or less (modeling accuracy B). When the Zr content was further increased, and the Zr content became more than 2.0 mol %, the change ratio became more than 5% (modeling accuracy C). When the melting point is decreased along with an increase in Zr content, a portion in which the crystals are melted is increased, and the bridge in the porous portion is deformed, resulting in loss of the modeling accuracy. As a result, the porosity and the average pore diameter also deviate from the design values.

Meanwhile, the mechanical strength is improved along with an increase in Zr content. When the Zr content is less than 0.3 mol % (0 mol %≤Zr<0.3 mol %), the mechanical strength is low, and the defect ratio becomes more than 20% (mechanical strength C). When the Zr content was increased (0.3 mol %≤Zr<0.7 mol %), the defect ratio was decreased (more than 10% and 20% or less), with the result that sufficient mechanical strength was obtained (mechanical strength B). When the Zr content was further increased, and the Zr content became 0.7 mol % or more, the defect ratio became 10% or less, with the result that the mechanical strength was further improved (mechanical strength A). When the degree of improvement in mechanical strength was small, the percentage in which the porous portion became defective during processing or in the use environment was increased.

It was found from the foregoing that, in order to simultaneously achieve the modeling accuracy and the mechanical strength (both the modeling accuracy and the mechanical strength are A or B), it was required that the ratio of the zirconium component in the metal component forming the metal oxide be 0.3 mol % or more and 2.0 mol % or less in the porous portion. Further, it was found that the zirconium component under this condition formed crystal grains having an average particle diameter of 10 μm or more as a metal oxide complexed with another metal component, and the crystal grains were connected to each other to have a network structure. The crystal grains containing zirconium as a main component form crystals complexed with Gd, and form a network in which the crystals have intricately permeated the inside the eutectic structure. With this configuration, the high mechanical strength originally possessed by the crystal grains containing zirconium as a main component is effectively imparted to the eutectic structure so that the sufficient mechanical strength is obtained also in the porous portion formed of a fine bridge portion. It was found that, in order to simultaneously achieve more preferred modeling accuracy and mechanical strength (both the modeling accuracy and the mechanical strength are A), it was required that the ratio of the zirconium component in the metal component forming the metal oxide be 0.7 mol % or more and 1.5 mol % or less.

As described above, by the method of manufacturing a porous ceramic modeled article according to the present invention, the mechanical strength of the modeled article can be significantly improved while high modeling accuracy is obtained.

According to the present invention, the mechanical strength of a ceramic article including a porous portion can be further improved while the features of the direct modeling system capable of obtaining a modeled article having a dense and complicated shape are taken advantage of.

According to the present invention, the method of manufacturing a ceramic article including a porous portion in which high mechanical strength is achieved through use of the direct modeling system, and the ceramic article can be provided.

The present invention is not limited to the embodiments described above, and various changes and modifications may be made without departing from the spirit and scope of the present invention. The following claims are appended hereto in order to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A ceramic article comprising a metal oxide containing aluminum oxide as a main component and including a dense portion having a porosity of less than 5 vol % and a porous portion having a porosity of 5 vol % or more,
    wherein a position at which the porous portion is arranged and a position at which the dense portion is arranged do not overlap each other,
    wherein a ratio of a zirconium component in a metal component contained in the porous portion is 0.3 mol % to 2.0 mol %,
    wherein at least part of the zirconium component contained in the porous portion forms a region comprising an oxide of zirconium,
    wherein zirconium is a main component in metal elements in the region, and
    wherein a ratio of closed pores contained in the porous portion is 0.5 vol % or less.

2. The ceramic article according to claim 1, wherein the ratio of the zirconium component in the metal component contained in the porous portion is 0.3 mol % to 1.5 mol %.

3. The ceramic article according to claim 2, wherein at least part of the zirconium component contained in the porous portion forms a metal oxide complexed with another metal component forming the porous portion, and
    wherein the region has an average particle diameter of 10 μm or more.

4. The ceramic article according to claim 3, wherein the porous portion contains a gadolinium component in an equimolar amount or more with respect to the zirconium component, and
    wherein the region is formed of a metal oxide in which zirconium and gadolinium are complexed with each other.

5. The ceramic article according to claim 1, wherein the porous portion has pores having an average pore diameter of 50 μm to 1,000 μm.

6. The ceramic article according to claim 1, wherein the porous portion has the porosity of 5 vol % to 60 vol %.

7. The ceramic article according to claim 1, wherein the dense portion includes a pore.

8. A ceramic article comprising a metal oxide containing aluminum oxide as a main component and including a dense portion having a porosity of less than 5 vol % and a porous portion having a porosity of 5 vol % or more,
- wherein a position at which the porous portion is arranged and a position at which the dense portion is arranged do not overlap each other,
- wherein the porous portion includes a plurality of open pores and a thickness of a bridge portion included in the porous portion is 1 mm or less,
- wherein a ratio of a zirconium component in a metal component contained in the porous portion is higher than a ratio of a zirconium component in a metal component contained in the dense portion,
- wherein at least part of the zirconium component contained in the porous portion forms a region comprising an oxide of zirconium,
- wherein zirconium is a main component in metal elements in the region, and
- wherein at least part of the zirconium component contained in the porous portion forms a metal oxide complexed with another metal component forming the porous portion.

9. The ceramic article according to claim 8, wherein the ratio of the zirconium component in the metal component contained in the porous portion is 0.3 mol % to 2.0 mol %.

10. The ceramic article according to claim 9,
- wherein the region has an average particle diameter of 10 μm or more.

11. The ceramic article according to claim 10, wherein the porous portion contains a gadolinium component in an equimolar amount or more with respect to the zirconium component, and
- wherein the region is formed of a metal oxide in which zirconium and gadolinium are complexed with each other.

12. The ceramic article according to claim 8, wherein the porous portion has pores that communicate to an outside.

13. The ceramic article according to claim 12, wherein the open pores have an average pore diameter of 50 μm to 1,000 μm.

14. The ceramic article according to claim 8, wherein the porous portion has the porosity of 5 vol % to 60 vol %.

15. The ceramic article according to claim 8, wherein the dense portion is formed so as to hold the porous portion, and the ceramic article is an adsorption plate including the porous portion as an intake and exhaust portion.

16. The ceramic article according to claim 8, wherein a ratio of closed pores contained in the porous portion is 0.5 vol % or less.

17. The ceramic article according to claim 8, wherein the dense portion includes a pore.

18. A method of manufacturing the ceramic article according to claim 13, the method comprising the steps of:
- (i) irradiating powder of the metal oxide with an energy beam based on modeling data to melt and solidify or sinter the powder, to thereby form a modeled article including the porous portion;
- (ii) causing the modeled article formed in the step (i) to absorb a liquid containing the zirconium component; and
- (iii) heating the modeled article that has absorbed the liquid containing the zirconium component,
- wherein, in the absorbing step, the liquid is absorbed so that the ratio of the zirconium component in the metal component contained in the porous portion becomes 0.3 mol % to 2.0 mol %.

* * * * *